United States Patent [19]  [11] 3,841,924
Sakakura et al.  [45] Oct. 15, 1974

[54] METHOD FOR PRODUCING A HIGH MAGNETIC FLUX DENSITY GRAIN ORIENTED ELECTRICAL STEEL SHEET

[75] Inventors: Akira Sakakura; Fumio Matsumoto; Kiyoshi Ueno, all of Eukuoka-ken, Japan

[73] Assignee: Nippon Steel Corporation, Tokyo, Japan

[22] Filed: Apr. 4, 1973

[21] Appl. No.: 347,876

[30] Foreign Application Priority Data
Apr. 5, 1972   Japan.............................. 47-34051

[52] U.S. Cl................. 148/111, 148/110, 148/182, 148/113
[51] Int. Cl............................................. H01f 1/04
[58] Field of Search ........... 148/110, 111, 112, 121, 148/113, 31.55; 75/123 L

[56] References Cited
UNITED STATES PATENTS
3,636,579   1/1972   Sakakura et al.................... 148/111
3,676,227   7/1972   Matsumoto et al................. 148/111

*Primary Examiner*—Walter R. Satterfield
*Attorney, Agent, or Firm*—Toren, McGeady and Stanger

[57] ABSTRACT

A method for producing a high magnetic flux density grain oriented electrical steel sheet or strip having remarkably excellent $B_8$ characteristics, comprising treating a hot rolled steel sheet containing a small amount of acid-soluble Al by combination of one-stage cold rolling with heavy reduction and annealing and forming during the final annealing secondary recrystallization grains having very high orientation.

1 Claim, 2 Drawing Figures

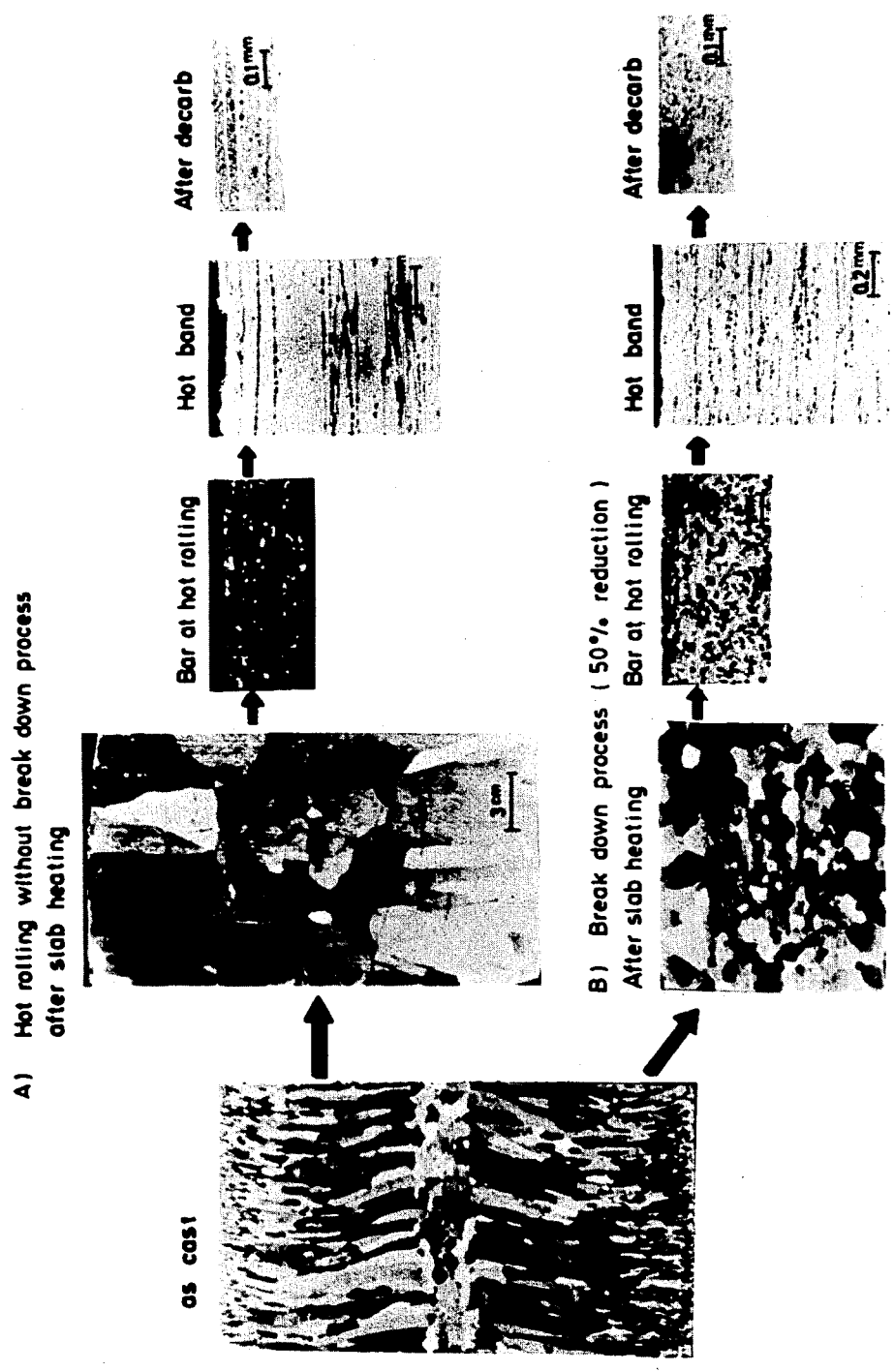
Fig. 1 Grain structures during the processing materials from continuously casted slab
A) Hot rolling without break down process after slab heating
B) Break down process (50% reduction) Bar at hot rolling After slab heating

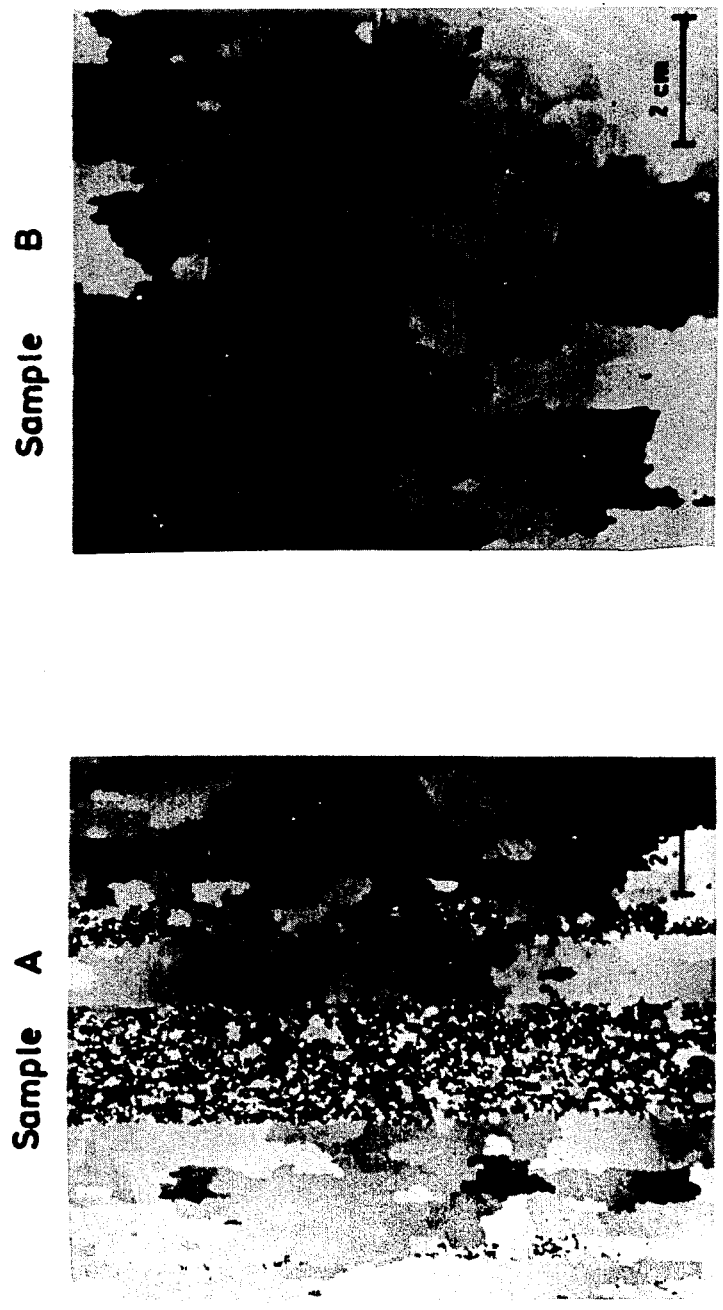
Fig. 2 Macro structures of final products

METHOD FOR PRODUCING A HIGH MAGNETIC FLUX DENSITY GRAIN ORIENTED ELECTRICAL STEEL SHEET

The present invention relates to a high magnetic flux density grain oriented electrical steel sheet (strip) having the grain orientation (110)[001] expressed by the Miller indices and easily magnetized in the rolling direction.

The grain oriented electrical steel sheet is required to have a high magnetic flux density and a low iron loss characteristic.

Recently, greater importance has been put on the minimization of size as well as improvement of performance of transformers etc., and for this purpose it is necessary to reduce the weight of iron cores for such applications. In general, in order to reduce the iron core weight, the iron core must be used in a range of high magnetic flux density so that a material having good magnetization characteristics, namely a high $B_8$ (a magnetic flux density at a magnetization power $8^{AT}/cm$) must be used for the iron cores.

Meanwhile, when used at a high magnetic flux density, the iron loss will increase and in this case it is noticeable that the iron loss of a material having higher $B_8$ characteristics is far much smaller than that of a material having lower $B_8$ characteristics and yet the increasing rate of the iron loss accompanying the increase of the magnetic flux density is lower in case of the material having high $B_8$ characteristics.

The present invention provides a method which can produce steel products satisfying the above requirements, namely a high magnetic flux density grain oriented electrical steel sheet or strip having remarkably excellent $B_8$ characteristics more than 1.9 Wb/m² as compared with a conventional grain oriented electrical steel sheet. The features of production of a high magnetic flux density grain oriented electrical steel sheet lie in treating a hot rolled steel sheet from a steel containing a small amount of acid-soluble Al (called simply Al hereinafter) by combination of one-stage cold rolling with heavy reduction and annealing and forming during the final annealing a secondary recrystallization grain having very high orientation in the steel to obtain a product having very high $B_8$ characteristics.

As is well known, the widely adopted ordinary ingot making process has been replaced by a continuous casting method in the field of steel making.

Advantages of the continuous casting include a technical advantage that the chemical composition is uniform in the lengthwise direction of slabs. However, when continuous casting is applied to the production of a grain oriented electrical steel sheet, one of the most important technical difficulties has been confronted. This is the formation of a columnar structure due to the rapid cooling and solidification which are proper to the continuous casting.

When a slab for grain oriented electrical steel produced by the continuous casting is heated at a high temperature (for example more than 1,300°C) for the hot rolling, the grains of the slab grow too large so that the secondary recrystallization caused by the final annealing is incomplete. This is attributed to the grain structure of the slab. On the other hand when the slab heating temperature is below 1,300°C, the secondary recrystallization behaviour is adversely affected in the subsequent steps and the secondary recrystallization is incomplete. This is due to the fact that the precipitates are not satisfactorily dissolved in solid.

A high magnetic flux density grain oriented electrical steel sheet is very sensible to and easily affected by the above conditions.

Therefore, one of the objects of the present invention is to provide a method which stabilizes the secondary recrystallization by overcoming the technical defects in the production of a grain oriented electrical steel sheet by a continuous casting, and utilizes various advantages of the continuous casting.

According to the present invention, a slab which is produced by continuous casting and has a predominantly columnar grain structure is heated at a suitable temperature and rolled by a rolling mill such as a breaking down mill to destroy the columnar grains, so that a material having snall and equi-axial grains can be obtained in spite of a high temperature heating (for example more than 1,300°C) for the subsequent hot rolling, and thus it is possible to produce commercially a steel product having a complete secondary recrystallization after the final annealing, the excitation characteristics in the rolling direction, and the $B_8$ characteristics of least 1.88Wb/m².

The present invention will be described in more details referring to the attached drawings.

FIG. 1 shows grain structures at individual steps in the production process of a high magnetic flux density electrical steel sheet using a continuously cast slab.

FIG. 2 shows the grain structure of a high magnetic flux density product produced by using a continuously cast slab.

The starting material applicable to the present invention should satisfy the following chemical composition:

Si : 2.0–4.0 wt.%
C : not more than 0.085 wt.%
Acid-soluble Al : 0.010–0.065 wt.%
Balance : Fe and unavoidable impurities.

The reasons for the limitations of individual elements are as follows:

When the Si content exceeds 4 percent, the cold rolling becomes troublesome.

At a carbon content more than 0.085 percent, it is impossible to obtain a high magnetic flux density product.

Al is the basic element in the present invention for obtaining high magnetic flux density product, and when the Al content is outside the above range, the secondary recrystallization becomes unstable, and thus a high magnetic flux density product can not be obtained.

The starting material used in the present invention is a slab having the chemical composition, and may be produced by continuously casting metal heat prepared by a known steel making method, such as by an open hearth, a converter and an electric furnace.

According to the present invention, the slab is cast in a thickness from 150–600 mm, preferably more than 200mm. This continuously cast thick slab is heated at such a temperature below 1,300°C as can obtain a break-down slab of a desired thickness depending on the slab thickness and the chemical composition of the slab. For example, when a slab of 300mm thickness is rolled at 50 percent reduction rate to obtain a break-down slab of 150mm. The slab is heated at 1,230°C. Then the slab is rolled at a reduction rate between 30 and 70 percent to destroy the columnar grains, and a break-down slab of desired thickness and composed mostly of recrystallization structure is obtained. In this case, the rolling direction, the rolling pass number, the horizontal reduction and vertical reduction may be neglected. If the slab heating temperature exceeds 1,300°C, the columnar structure grows course and no substantial effect can be obtained by the subsequent breaking down treatment. Regarding the reduction rate, the reduction rate of the breaking down rolling is desirably in a range of 30 to 70 percent in order that more than 80 percent of the grains composing the slab after the high temperature heating of the hot rolling does not exceed 25mm in average grain diameter.

The breaking-down rolling may be done by any conventional mill such as break-down mill or a hot rolling mill. They can be selected in view of the production method and production capacity, etc. In any way, the conditions of the breaking-down rolling should be selected in such a way that most (more than 80 percent) of the grains constituting the break-down slab after the reheating in the subsequent hot rolling step should not exceed 25mm in average grain diameter.

The reason for limiting the slab thickness to the range of 150 to 600mm is as under. With slab thickness less than 150mm, the slab thickness after the breaking down of 30 percent will be less than 100mm, and if such a thin slab is used as the starting material and hot rolled, the grain structure of the hot rolled steel sheet becomes coarse and good secondary recrystallization structure can not be obtained. On the other hand, when the slab thickness is more than 600mm, the reduction at the breaking-down must exceed 70 percent and in this case, the breaking down will require a longer time at a heating temperature below 1,300°C, so that the slab temperature lowers and the breaking down can not be practised. The preferable slab thickness range more than 200mm gives large advantages in commercial production. Namely, a thick slab improves the productivity.

The break-down slab of the specified thickness is reheated and hot rolled into a hot coil. The reheating temperature is desirably above 1,300°C, and at a temperature below 1,300°C the secondary recrystallization is unstable.

It has been already found by the present inventors and is well known that the AlN precipitate is effective for development of the secondary recrystallization structure of (110)[001] orientation in a grain oriented electrical steel sheet, but in case of a high magnetic flux density grain oriented electrical steel sheet, it is necessary to dissolve AlN once in the matrix at the slab heating stage in the hot rolling in order to obtain required small-size AlN, and the minimum temperature for the AlN solid solution is 1,300°C.

The hot rolled steel sheet is then annealed at a temperature between 950° and 1,200°C for 30 seconds and 10 minutes. After the annealing the sheet is rapidly cooled from a temperature above 950°C down to a temperature below 400°C within 2 to 200 seconds.

The steel sheet after the annealing is cold rolled by one step with 81 to 95 percent reduction into a final thickness.

The steel sheet reduced into the final thickness is subjected to a continuous decarburization annealing at a temperature between 700°–900°C for 30 seconds to 30 minutes to reduce the carbon content below 0.005 percent.

The surface of the steel sheet after the decarburization annealing is coated with an annealing separater to prevent the burning of the steel sheet during the final finishing annealing.

The final finishing annealing should be done at such a temperature and for such a time that the secondary recrystallization grains of (110)[001] orientation fully develops and impurities disappear by the purifying annealing. For this purpose, annealing above 1,000°C for more than 5 hours is required.

The purpose of the breaking down of the continuously cast slab at a specific temperature, and reduction rate is, as mentioned above, to destroy the columnar grains in the continuously cast slab and to obtain small and uniform equi-axial grains which are very sensitive to the reheating of the hot rolling.

The coarsening of the grains by the slab heating at the hot rolling causes non-uniformity of the primary recrystallization grains after the decarburization annealing and hinders development of the secondary recrystallization of (110)[001] orientation by the final finishing annealing.

In general, the following formula can be established regarding the driving power at the secondary recrystallization. In case of a grain oriented electrical steel sheet, the driving power is boundary energy and if this energy is $E/V$ per unit volume $$E/V = K(\sigma_M/D_M - \sigma_G/D_G) - I$$

$D_M$ : the average diameter of the primary recrystallization grain (matrix) after the decarburization annealing $\sigma_M$ : the boundary energy of the primary recrystallization grain (matrix) after the decarburization annealing $D_G$ : the average diameter of the primary recrystallization grains of (110)[001] orientation to be subjected to the secondary recrystallization $\sigma_G$ : the boundary energy between the primary recrystallization grains of (110)[001] orientation to be subjected to the secondary recrystallization and the primary recrystallization grains of the matrix $I$ : restricting force against the boundary movement by the precipitates Since it is supposed that $\sigma_G \approx$ (nearly equal) $2\sigma_M$ it is necessary that $D_G \geq 2D_M$ after the decarburization annealing in order that the secondary recrystallization grains grow ($D_G \rightarrow \infty$) in the final annealing and no primary recrystallization grains remain. This means the grains of the primary recrystallization structure after the decarburization annealing must be small and uniform.

This is clearly understood by comparing the structures after the decarburization annealing obtained by the conventional process and by the present inventive process including the breaking down step as shown in FIG. 1 and FIG. 2 respectively.

Namely, according to the conventional process (A) the grains become coarse by the slab heating during the hot rolling and the structure of the hot rolled steel sheet remains coarse during the continuous annealing and the primary recrystallization structure after the decarburization annealing is also coarse and not uniform.

Thus, it is understood from the material that the secondary recrystallization is incomplete.

While, according to the present inventive process (B) in which the breaking down is effected, there is no problem of non-uniformity of grains as in the process (A) and the secondary recrystallization is complete.

The coarse grains present after the slab heating as seen in the conventional process remain as large elongated grains still in the hot rolled steel sheet as in FIG. 1, and such large elongated grains remain as <110> zone axis grains, specifically as grains of {112} <110> ~ {114} <110> orientation which is the final stabilized orientation of the rolling, and these grains are stable against the subsequent cold rolling and annealing and are not destroyed.

Particularly in case of the present invention in which the final thickness is obtained only on stage cold rolling after the annealing of the hot rolled steel sheet, the coarse grains of <110> zone axis present in the hot rolled steel sheet are brought into the sheet of the final thickness because no intermediate annealing is included during the cold rolling as in the conventional method so that non-uniformity of the primary recrystallization structure after the decarburization annealing is accelerated thereby. The same thing can be said in the case when the breaking-down treatment is applied, and for this reason, the heating temperature is limited below 1,300°C.

An example of the present invention will be set forth below:

EXAMPLE

A 180mm thick slab (Sample A) and a 300mm thick slab (Sample B) were prepared by continuous casting from a silicon steel heat containing 0.05% C, 30% Si and 0.03% Al.

The Sample A was soaked at 1,350°C for 30 minutes and hot rolled into a 2.3mm thick plate.

Meanwhile, the Sample B was heated at 1,230°C for 30 minutes, then subjected to the breaking down treatment into a 180mm thick slab and then soaked at 1,350°C for 30 minutes just as the Sample A and hot rolled into a 2.3mm thick plate. The two hot rolled plates A and B were subjected to a continuous annealing at 1,050°C, then rapidly cooled to the room temperature in 60 seconds, and cold rolled at a reduction rate of 87.5 percent into a final sheet thickness of 0.3mm. Then the samples were subjected to a decarburization annealing and a final annealing in $H_2$ gas. The magnetic properties in the rolling direction of the samples were as under:

Sample A  $B_8$ = 1.832 (Wb/m$^2$)  $W_{17}$ = 1.43 (Watts/kg)

Sample B  $B_8$ = 1.941 (Wb/m$^2$)  $W_{17}$ = 1.08 (Watts/kg)

The grain structures of these two samples are shown in FIG. 2-A and FIG. 2-B. As clearly seen from these photographs, the bad portions of the secondary recrystallization are seen in a band form and thus the grain structure is very irregular. This non-uniformity of the structure is reflected by the difference of the magnetic characteristics and it can be clearly understood that Sample B which was treated by the present invention shows excellent characteristics.

What is claimed is:

1. A method for producing a high magnetic flux density grain oriented electrical steel sheet comprising a step of hot rolling a continuously cast slab containing not more than 0.085 percent of carbon, 2.0–4.0 percent of silicon and 0.010–0.065 percent of acid-soluble aluminum, a step of annealing the hot rolled steel sheet at a temperature between 950° and 1,200°C and rapidly cooling the steel sheet to precipitate AlN, subjecting the steel sheet to a one-stage cold rolling at a reduction rate betwen 81 and 95 percent to obtain a final sheet thickness, a step of decarburization annealing of the cold rolled steel sheet, and a step of final annealing, said continuously cast slab being 150 to 600mm thick, and being heated at a temperature below 1,300°C and subjected to a break-down rollong at a reduction rate between 30 and 70 percent in the slab thickness direction before the hot rolling step, more than 80 percent of the grains of the slab after the reheating for hot rolling being less than 25mm in average grain diameter.

* * * * *